J. W. EARDLY.
Corn Marker.
No. 83,612.
Patented Nov. 3, 1868.
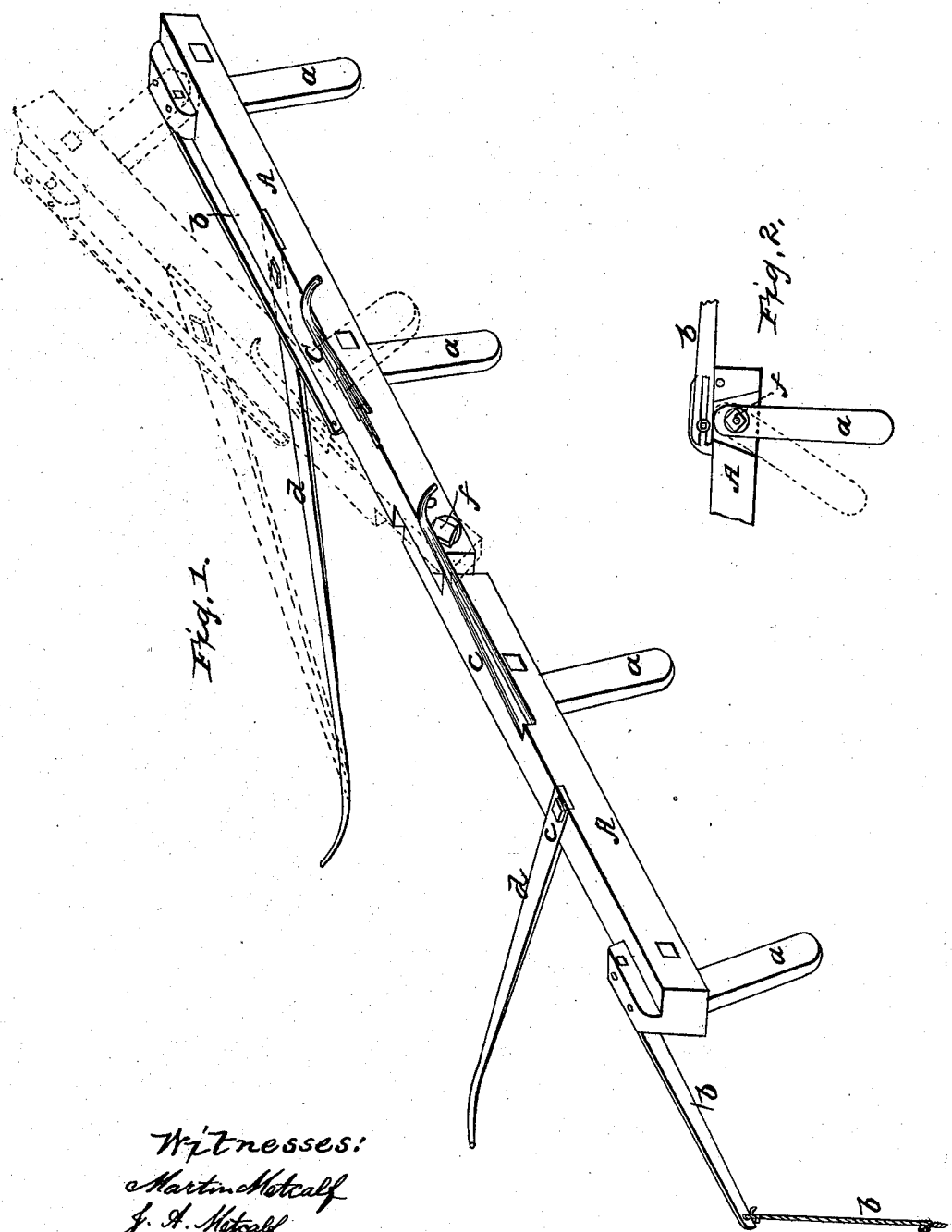

JAMES W. EARDLY, OF GRAND RAPIDS, MICHIGAN.

Letters Patent No. 83,612, dated November 3, 1868.

IMPROVEMENT IN CORN-MARKER.

The Schedule referred to in these Letters Patent and making part of the same.

*To all whom it may concern:*

Be it known that I, JAMES W. EARDLY, of Grand Rapids, in the county of Kent, and State of Michigan, have invented a new and useful Improvement in Corn-Markers; and I do hereby declare that the following is a full and exact description thereof, reference being had to the accompanying drawings, and to the letters of reference marked thereon.

The nature of my invention consists in providing the corn-marker bar with one or more hinges, placed near the centre, and operating in such a manner that one half of the frame may be lifted up by its handle, so as to pass over stumps or other obstructions, as well as to allow the runners or markers to follow the inequalities of surface to be planted.

Also, in providing the marker-bar with suitable devices, whereby the distance between the rows may be regulated at will.

Also, in providing the marker-bar with movable and adjustable guide-arms, whereby the machine is kept at the proper distance from the rows previously marked.

To enable others skilled in the art to make and use my invention, I will now proceed to describe its construction and operation.

Figure 1 is a perspective view, showing the construction of the machine.

Figure 2 is a front sectional view of the end of marker-bar, showing one of markers, a part of the guide-arm, and the manner of adjusting them, for the purpose of regulating the distance between the rows.

A A, fig. 1, represent the marker-bar. This is made in two parts, each attached to the other at the joint made by the bolt $f$, passed through either of three holes made through the halved ends of the marker-bar, for the double purpose of forming a hinge in the centre of the bar, and regulating the distance between the two middle runners or markers.

$b\ b$ represent the two movable and adjustable guide-arms, with pendants, $b'$, attached to their outer ends.

The manner of attaching and adjusting these arms, and also the movable and adjustable end pair of markers, is clearly shown in fig. 2, the former by a slot in its end, through which the bolt attaching it to the bar passes, and the latter by cutting the mortise in the marker-bar, where it receives the runner, on a bevel, so as to allow the runner to be swung either out or in, on the bolt $f'$, so as to increase or diminish the distance between the markers or runners, as shown by the red lines in fig. 2.

In operating this machine, while the first rows are being marked, the operator will fold over the guide-arm which runs nearest the fence on to the marker-bar, as shown in fig. 1. Having the handles $c\ c$ well in hand, he is able to lift up either half of the machine, as may be desired, in order to pass over or around any obstructions, without the least hindrance, or deviation from a straight line, as shown by the red lines in fig. 1, the weight of the same being divided between the support of the thill in front, on the horse, and the hand of the operator in rear of the machine.

It may be observed here that this machine may be provided with one or more joints, provided these are placed between the handles, but not otherwise, since it is by the handles that we operate this machine, one not having to leave his place nor to stop for any purpose of adjustment of the machine, after the work is once fairly begun, while the marks are clear and distinct over the whole surface, the runners fitting every inequality of the same, and passing in a right line over and around all obstructions.

I do not claim broadly the use of the joints in the marker-bar for the purpose of fitting the surface of the ground, for I am aware that this device has been before used.

What I claim, and desire to secure by Letters Patent, is—

1. The adjustable hinged bars A A, in combination with the arms $a\ a\ a\ a$ and slotted arms $b\ b$, arranged and operated substantially in the manner shown and described, for the purpose set forth.

2. The manner of adjusting the marker $a$, fig. 2, substantially as and for the purpose described.

JAMES W. EARDLY.

Witnesses:
T. SINCLAIR,
M. METCALF.